April 23, 1935.  D. FIRTH  1,998,497
AUTOMATIC HEAT CONTROL FOR CARBURETORS
Filed Aug. 22, 1932  3 Sheets-Sheet 2
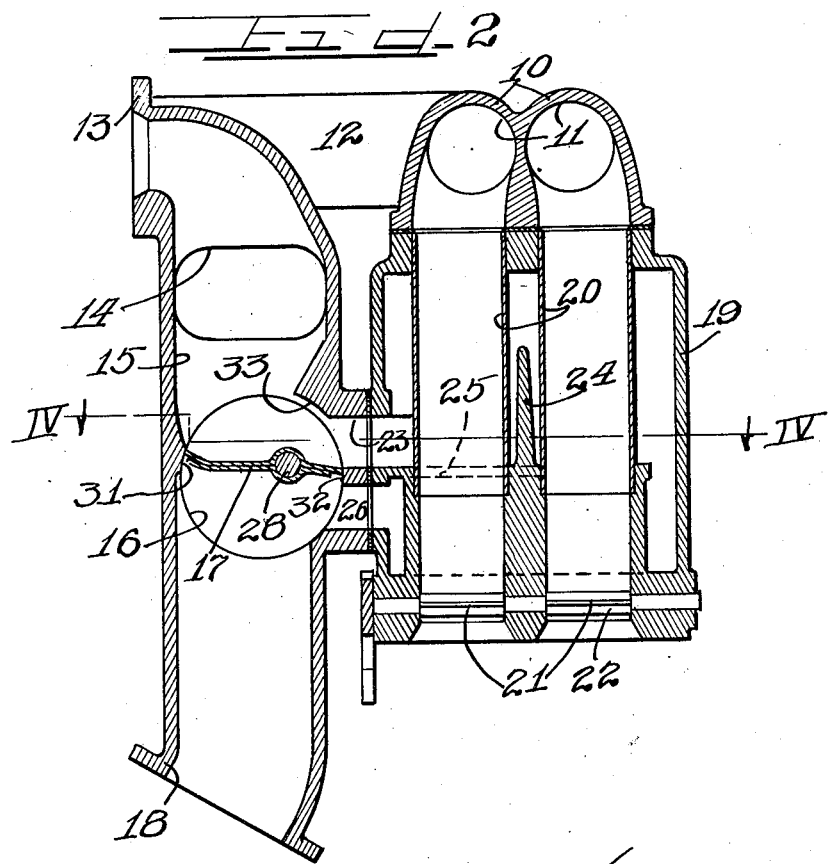
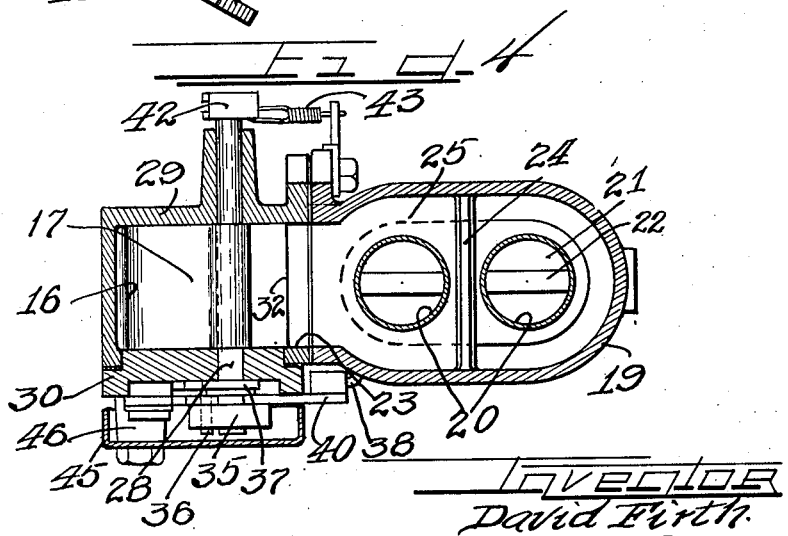

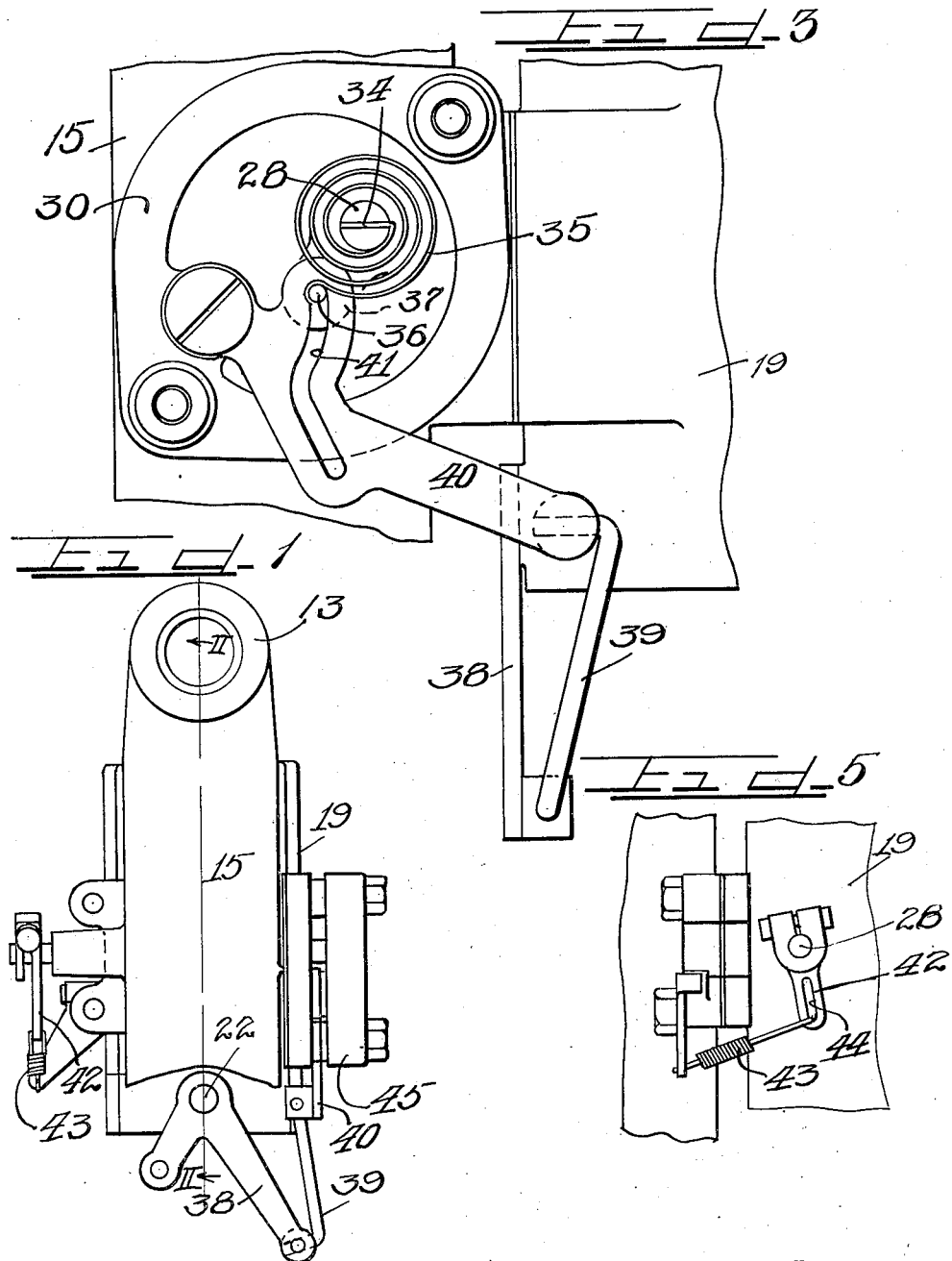

April 23, 1935. D. FIRTH 1,998,497
AUTOMATIC HEAT CONTROL FOR CARBURETORS
Filed Aug. 22, 1932 3 Sheets-Sheet 3
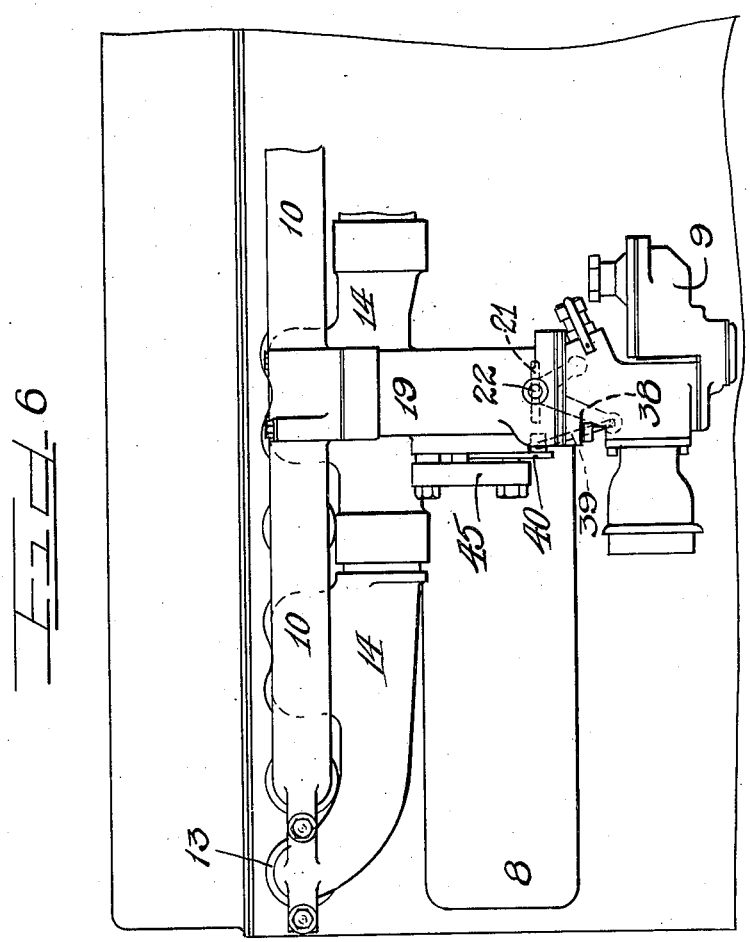

Patented Apr. 23, 1935

1,998,497

UNITED STATES PATENT OFFICE 1,998,497

AUTOMATIC HEAT CONTROL FOR CARBURETORS

David Firth, Flint, Mich., assignor to Marvel Carbureter Company, Flint, Mich., a corporation of Illinois Application August 22, 1932, Serial No. 629,855

11 Claims. (Cl. 123—122)

This invention relates to an improved thermostatic heat control for the induction system of internal combustion engines and has special reference to an automatic control of the heat supplied to the induction system, modified by the power demand on the engine.

It is an object of this invention to provide an improved and simplified thermostatic heat control adapted to automatically compensate for variations in the available heat supply and to modify the controlling temperature of the induction system in response to variations in the power demand on the engine. A variable temperature in the induction system is highly desirable since smoothness of operation at light loads or idling requires a maximum heating of the induction system at a time when the heating fluid available is at a lower temperature and small volume of flow while for maximum engine output the heating effect should be at a minimum while the heating fluid is then available at a high temperature and greatly increased volume and pressure. I accomplish these objects by providing an unbalanced valve controlling the diversion of exhaust gases for heating the induction system and controlling this valve by a spring type of thermostat, varying the spring tension by means of a throttle control, since the throttle position affords a convenient index of the power demands on the engine; and hence of the desirable heating effect required for best results in the induction system.

It is another object of this invention to provide an improved heat control system for the intake manifold of an internal combustion engine comprising an unbalanced diversion valve so mounted in the exhaust manifold as to divert the exhaust gases into a heating jacket on the intake manifold and arranged to be moved from its diverting position by the pressure of exhaust gases thereon, this movement being variably resisted by cooperating thermostatic and throttle controls which normally impose sufficient resistance against valve opening to assure a variable heating effect on the intake manifold which is at a maximum under idling conditions with a cold engine.

Other and further important objects of this invention will be apparent from the disclosures in the specification and the accompanying drawings.

This invention (in a preferred form) is illustrated in the drawings and hereinafter more fully described:

On the drawings:

Figure 1 is a fragmentary elevation, with parts broken away, of the exhaust and induction systems of an internal combustion engine embodying the features of this invention.

Figure 2 is a section, partly in elevation; taken on the line II—II of Fig. 1 showing the exhaust diversion valve and the heating jacket for the induction system.

Figure 3 is an end view from the right side of Fig. 1 with the thermostat cover removed;

Figure 4 is a section on the line IV—IV of Fig. 2;

Figure 5 is a fragmentary view of the lift side of Fig. 1; and

Figure 6 is a fragmentary elevation of an internal combustion engine and its carburetion and manifolding systems, showing an embodiment of this invention therein.

As shown:

The heating system of this invention has been illustrated in connection with a dual type of intake manifold 10 having separate passages 11 feeding groups of cylinders in an engine block 8 through branches, one of which is shown at 12 in Fig. 2. It is common practice to have a row of alternating exhaust and intake port connections, one exhaust connecting flange being shown at 13 which feeds into an exhaust manifold 14 conveniently located beneath the various intake manifold branches 12. An exhaust outlet passage 15 leads downwardly from the manifold 14 and contains a diversion valve chamber 16 formed as a cylinder transversely disposed in the passage and open at the front for insertion of a diversion valve 17, to be later described. Below the valve chamber, the exhaust passage terminates in a mounting flange 18 for the attachment of the usual exhaust pipe.

The intake manifold 10 is fed by a riser casting 19 located between the manifold and a carburetor 9, the riser forming a heating jacket about tubes 20 which form riser passages from the carburetor to the manifold 10, twin throttle valves 21 on a common shaft 22 being located at the lower end of the riser. The use of relatively thin tubes 20 inserted in the heating jacket casting facilitates heat transfer to the mixture flowing therethrough and is therefore my preferred construction, although it will be understood that such a construction is not essential to this invention. Also, while my invention is illustrated in connection with a dual type of intake manifold, it will be evident that it is equally applicable to a single type since my invention relates to the control of the heat supply to the heating jacket 19.

The valve chamber 16 is connected by a passage 23 to the heating jacket 19, the exhaust gas flowing up around the tubes 20 and over a baffle 24 therebetween, thence through the lower part of the jacket beneath a baffle 25 to an outlet passage 26 opening into the valve chamber below the first passage 23.

The unbalanced diversion or damper valve 17 is mounted on a shaft 28 journaled in offset relationship to the axis of the valve chamber one end of the shaft extending through the rear wall 29 of the chamber while the front end extends through a cover or cap 30 closing the front of the chamber. The overhanging edge of the valve cooperates with a land 31 on the chamber wall to cause a deflection of the exhaust gases into the passage 23 while the narrow side of the valve cooperates with a land 32 between the two passages 23 and 26, the valve opening in an anti-clockwise direction in Figure 2 in response to exhaust pressure. During the opening movement the narrow side of the valve approaches a land 33 above the passage 23 but this land may be purposely cut back a predetermined amount to allow a certain amount of exhaust gas flow to the heating jacket even with the valve open.

The front end of the shaft 28 is slotted at 34 to receive one end of a coiled bimetallic thermostatic member 35 the other end of which is hooked to a pin 36 carried by a lever 37 pivoted on the shaft 28. On referring to Figure 3 it will be evident that a counter-clockwise movement of the lever 37 and pin 36 will unwind or loosen the thermostat 35 to in effect decrease the tension thereof and tend to rotate the valve shaft likewise or in a direction to cause the counter clockwise opening of the valve in response to exhaust pressure thereon. Thus the effect would be to decrease the temperature required to unwind the thermostat and thus assist the valve to opening readily when the desired temperature is reached.

While the lever 37 could be placed under the control of the operator independently of other controls, I prefer to coordinate the lever movements with the operation of the throttle valves 21 since much more heat is desirable under idling conditions than when operating the engine under load. Since the throttle controls the engine it is thus convenient to derive the thermostat control from the throttle, although various types of engines may require different stages of temperature variations between the idling and power requirements. The throttle control may conveniently be taken from a lever 38 carried by the throttle shaft 22, a link or rod 39 connecting the lever 38 to a separate lever 40 pivoted to one side of the thermostat and having a cam like groove 41 therein engaging the anchor pin 36. Reference to Figure 3 will show that the first part of the groove 36 may be arranged as of constant radius relative to the lever pivot, the subsequent part of the groove being of increasing radius so that as the throttle is opened the lever 40 swings counterclockwise in Figure 3 eventually allowing the pin 36 to swing in a direction to release the tension in the coiled thermostat and thus in effect reducing the temperature required to open the diversion valve.

The valve 17 is not provided with an abutment defining its closed or diverting position, but the projecting rear end of the shaft 28 has a lever 42 applied thereto and engaged by a spring 43 which spring in its normal contracted position defines the desired valve diverting position. The valve may however swing past the normal position by stretching the spring 43 which is proportioned to yield before the thermostat is subjected to damaging strains. The lever 42 is provided with an elongated slot 44 into which one end of the spring is hooked, the slot providing sufficient lost motion or play to permit normal opening movement of the valve.

The thermostat is normally covered by a shield 45 mounted on spacer studs 46 which allow a circulation of air under the edges of the shield to modify the responsiveness of the thermostat to heat conducted along the valve shaft 28 and radiated from the valve chamber cover 30.

In the operation of the heat control of my invention reference may be had to Figures 2 and 3 wherein the throttles are closed and the diversion valve 26 is turned to cause all exhaust gases to pass through the intake manifold heating jacket. The thermostat is then exerting the maximum amount of tension opposing an opening movement of the diversion valve due to the exhaust pressure acting on the unbalanced area thereof. With the maximum heat supply thus assured quick warming up of the engine results. As the exhaust pressure increases due to a speeding up of the engine it will tend to open or rotate the valve counterclockwise, allowing some of the gas to escape past the valve. This opening movement of the valve may even extend to the full open position, against the resistance of the thermostat, if the exhaust pressure increases sufficiently. As the exhaust manifold warms up heat is transferred to the thermostat decreasing the resistance thereof and in hot climates or under heavy and continuous loads the thermostat may even open the valve independently of exhaust pressure.

As the throttle is opened the anchor pin 36 is shifted in a counterclockwise direction as shown in Figure 3 and thus releases the tension of the thermostat, thus allowing the valve to open when only a minimum amount of exhaust pressure exists. For example if the driver opens the throttle wide to climb a hill before the thermostat has been warmed up enough to automatically release some of the cold tension therein, the throttle linkage operates to mechanically release this tension so that back pressure is cut down in the exhaust system by allowing the valve to open against less resistance.

It will thus be seen that I provide an unbalanced diversion valve normally resiliently held in its diverting position and I vary the resistance opposing the opening of the valve in accordance with both temperature and operating demand conditions, the valve being opened by temperature alone only under extreme conditions.

Although the present invention has been hereinabove described as embodying an unbalanced valve, a preferred form of the invention, it will be understood by one skilled in the art that many mechanical changes may be made without departing from the spirit of the invention. For example, a balanced diversion valve may be used and, since a balanced valve would not be subject to an opening effect from exhaust gas pressure, the yielding stop might be eliminated; also, a direct or other type control of the effective temperature responsiveness of the thermostat might be employed, all in a manner deemed obvious from the disclosures herein.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A manifolding system for internal combustion engines comprising an exhaust manifold and a throttle controlled intake manifold having a heating jacket adapted to be heated by gases from the exhaust manifold, a valve chamber in said exhaust manifold, ports opening into said valve chamber and in communication with the heating jacket of the intake manifold, an unbalanced damper valve pivotally mounted in said valve chamber in such a way as to tend to open in response to exhaust pressure, said valve being adapted to normally yieldingly divert the flow of exhaust gases from said exhaust manifold through one of the ports to the heating jacket, a coiled thermostat operatively connected to the unbalanced valve to yieldingly maintain said valve in said normal position in opposition to the pressure of the exhaust gases thereon and means connected to the throttle to vary the tension of said coiled thermostat whereby to vary the resistance opposing the opening of the valve to reduce the normal temperature in the heating jacket as the throttle is moved towards the open position.

2. A manifolding system for internal combustion engines comprising an exhaust manifold and an intake manifold having a heating jacket adapted to be heated by gases from the exhaust manifold, a valve chamber in said exhaust manifold, ports opening into said valve chamber and in communication with the heating jacket of the intake manifold, an unbalanced damper valve pivotally mounted in said valve chamber in such a way as to tend to open in response to exhaust pressure, said valve being adapted to normally yieldingly divert the flow of exhaust gases from said exhaust manifold through one of the ports to the heating jacket, a coiled thermostat operatively connected to the unbalanced valve to yieldingly maintain said valve in said normal position in opposition to the pressure of the exhaust gases thereon and means to vary the tension of said coiled thermostat whereby to vary the resistance opposing the opening of the valve.

3. A manifolding system for internal combustion engines comprising an exhaust manifold and a throttle controlled intake manifold having a heating jacket adapted to be heated by gases from the exhaust manifold, a valve chamber in said exhaust manifold, ports opening into said valve chamber and in communication with the heating jacket of the manifold, an unbalanced diversion valve so mounted in said valve chamber as to tend to open from a normal position obstructing the exhaust manifold in response to increased exhaust gas pressure, thermostatic means normally opposing the opening movement of said diversion valve and adapted to increasingly yield to said opening movement as the temperature increases, and means for varying the opposing force of said thermostatic means in response to engine operating conditions.

4. A manifolding system for internal combustion engines comprising an exhaust manifold and a throttle controlled intake manifold having a heating jacket adapted to be heated by gases from the exhaust manifold, a valve chamber in said exhaust manifold, ports opening into said valve chamber and in communication with the heating jacket of the manifold, an unbalanced diversion valve so mounted in said valve chamber as to tend to open from a normal position obstructing the exhaust manifold in response to increased exhaust gas pressure, thermostatic means normally opposing the opening movement of said diversion valve and adapted to increasingly yield to said opening movement as the temperature increases, and throttle operated means adapted to increase the opposing pressure of said thermostatic means as the throttle moves toward its idling position.

5. A heat control system for the intake manifold of an internal combustion engine, comprising a heating jacket associated with the intake manifold, an exhaust manifold connection to the heating jacket, an unbalanced valve adapted in one position to divert exhaust gases to the heating jacket, said valve being so arranged as to be shifted from its diverting position by exhaust gas pressure thereon, a coiled bimetallic thermostat operatively connected at one end to said valve to variably oppose said shifting movement, a movable anchor for the other end of said thermostat and means for moving said thermostat anchor in step with the power requirements of the engine to vary the temperature responsiveness of said thermostat.

6. A heat control system for the intake manifold of an internal combustion engine, comprising a heating jacket associated with the intake manifold, an exhaust manifold connection to the heating jacket, an unbalanced valve adapted in one position to divert exhaust gases to the heating jacket, said valve being so arranged as to be shifted from its diverting position by exhaust gas pressure thereon, a thermostat operatively connected to said valve to variably oppose said shifting movement, a movable anchor for said thermostat and throttle operated means adapted to shift said thermostat anchor to vary the thermostatic control in predetermined relationship to the movement of the throttle.

7. A heat control system for the intake manifold of an internal combustion engine, comprising a heating jacket associated with the intake manifold, an exhaust manifold connection to the heating jacket, an unbalanced valve adapted in one position to divert exhaust gases to the heating jacket, said valve being so arranged as to be shifted from its diverting position by exhaust gas pressure thereon, a coiled bimetallic thermostat operatively connected at one end to said valve to variably oppose said shifting movement, a movable anchor for the other end of said thermostat, and throttle operated means adapted to shift said thermostat anchor to vary the thermostat control in predetermined relationship to the movement of the throttle.

8. A heat control for the manifolding system of an internal combustion engine having an intake and an exhaust manifold including, a heating jacket associated with the intake manifold, means establishing communication between the exhaust manifold and said jacket, valve means controlling the diversion of exhaust gases from the exhaust manifold to said jacket, said valve means comprising an unbalanced valve positioned in said exhaust manifold and transversely to the flow of exhaust gases and pivotally mounted to be swung by the force of exhaust gases from a closed position transversely of the exhaust manifold, wherein exhaust gases are by-passed through the jacket, to an open position, wherein the gases are free to exhaust without passing through the jacket, thermostatic means responsive to exhaust temperatures effecting exclusive direct control over said valve means and opposing swinging of said valve by exhaust gases, and means varying the responsiveness of said thermostatic means to exhaust temperatures to decrease the temperature at which the exhaust gases overcome the thermostatic means when the throttle is moved to open position.

9. A heat control for the manifolding system of an internal combustion engine including a heating jacket associated with the intake manifold, means establishing communication between the exhaust manifold and said jacket, valve means controlling the diversion of exhaust gases from the exhaust manifold to said jacket, thermostatic means responsive to exhaust temperatures effecting a control over said valve means, and means reducing the exhaust temperature to which said thermostatic means is responsive to decrease the diversion of exhaust gases to said jacket in accordance with the degree of throttle opening.

10. A heat control for the manifolding system of an internal combustion engine including a heating jacket associated with the intake manifold, means establishing communication between the exhaust manifold and said jacket, valve means controlling the diversion of exhaust gases from the exhaust manifold to said jacket, thermostatic means effecting exclusive direct control over said valve means, and throttle operated means exercising a control over the effective temperature responsiveness of said thermostatic means.

11. A heat control for the manifolding system of an internal combustion engine including a heating jacket associated with the intake manifold, means establishing communication between the exhaust manifold and said jacket, valve means controlling the diversion of exhaust gases from the exhaust manifold to said jacket, thermostatic means responsive to exhaust temperatures effecting exclusive direct control over said valve means, and throttle operated means varying the responsiveness of said thermostatic means to exhaust temperatures.

DAVID FIRTH.